US007573018B2

(12) United States Patent
Jones

(10) Patent No.: US 7,573,018 B2
(45) Date of Patent: Aug. 11, 2009

(54) COUNTING APPARATUS AND METHOD FOR A POULTRY PROCESSING PLANT

(76) Inventor: Clyde B. Jones, Route 1, Box 174D, Brodhead, KY (US) 40409

( * ) Notice: Subject to any disclaimer, the term of this patent is extended or adjusted under 35 U.S.C. 154(b) by 0 days.

(21) Appl. No.: 12/106,787

(22) Filed: Apr. 21, 2008

(65) Prior Publication Data

US 2008/0191125 A1    Aug. 14, 2008

(51) Int. Cl.
G01N 9/04 (2006.01)
G06M 7/00 (2006.01)
H01J 40/14 (2006.01)

(52) U.S. Cl. .................................. 250/223 R
(58) Field of Classification Search ............. 250/223 R
See application file for complete search history.

(56) References Cited

U.S. PATENT DOCUMENTS

| 4,021,336 | A |  | 5/1977 | Brook et al. |
| 4,122,953 | A |  | 10/1978 | Brook |
| 4,150,374 | A |  | 4/1979 | Brook |
| 4,201,156 | A |  | 5/1980 | Kahler |
| 4,385,419 | A |  | 5/1983 | Cantrell |
| 4,610,361 | A |  | 9/1986 | Elliot |
| 5,033,065 | A |  | 7/1991 | Keromnes et al. |
| 5,101,767 | A |  | 4/1992 | Williams et al. |
| 5,326,311 | A |  | 7/1994 | Persoon et al. |
| 5,614,709 | A |  | 3/1997 | Smith |
| 5,646,398 | A |  | 7/1997 | Sieksmeier et al. |
| 5,983,837 | A |  | 11/1999 | Briggs et al. |
| 6,496,273 | B1 |  | 12/2002 | Stimpson et al. |
| 7,133,742 | B2 |  | 11/2006 | Cruysen et al. |
| 2002/0081181 | A1 | * | 6/2002 | Yokomori et al. ...... 414/416.02 |
| 2006/0003682 | A1 |  | 1/2006 | Petersen et al. |

* cited by examiner

*Primary Examiner*—Seung C Sohn
(74) *Attorney, Agent, or Firm*—Waters Law Group PLLC; Brian W. Foxworthy; Robert R. Waters

(57) ABSTRACT

A counting system for a poultry processing plant that uses conveyors is disclosed. Two types of conveyors are addressed, one where poultry hang from the conveyor and one where the carcasses are supported above the conveyor. The sensors are located at different levels to sense elements of the carriers as well as poultry. Logic within the system compares the readings of the sensors to determine whether a chicken is present and whether to increment the total. Additionally, the sensors are recessed in steel tubing on mounting plates which support their own cover plates. The sensors can thereby be adjusted for alignment while the cover plates move with the sensors. The cover plates are easily removed for cleaning and put back into position without blocking the sensors. Air is blown through the steel tubing to keep a positive air pressure in the tubing to prevent dirt from entering the openings.

10 Claims, 6 Drawing Sheets

COUNTING APPARATUS AND METHOD FOR A POULTRY PROCESSING PLANT

RELATED U.S. APPLICATION DATA

This application claims priority from U.S. Provisional Application 60/684,330, filed on May 25, 2005 and U.S. patent application Ser. No. 11/440,496 now issued as U.S. Pat. No. 7,378,642. This application relates to a counting apparatus and method for a poultry processing plant. The entire disclosure contained in U.S. Provisional Application 60/684,330, and U.S. Pat. No. 7,378,642, including the attachments thereto are incorporated herein by reference.

FIELD OF THE INVENTION

This invention relates generally to counting chicken and chicken carcasses. More specifically, this invention relates to counting the chicken and chicken carcasses as they pass selected points on a conveyor carrying the bodies through the processing plant.

BACKGROUND OF THE INVENTION

In a typical poultry processing plant, a conveyor runs through the various sections of the plant. In some parts of the plant, the chicken or carcass hangs down from the conveyor, while in other parts, it is supported from a conveyor below. In the case in which it hangs from the conveyor, trolleys attached to the conveyor serve as bases with sets of hooks, called shackles, specially formed to retain chicken and chicken carcasses hanging upside down. A shaft is located intermediate the shackles and the trolley base. This shaft is pivotally connected to the base. Depending on the stage of processing, the shackles are formed to grasp the feet of the chicken or the knuckle of the joint below the thigh. In the case where the chicken carcass is supported above the conveyor, shafts extend up from the conveyor with cones located on the end of the shafts with the taper of the cone directed upward. The shafts are carried by bases attached to the conveyor. For this stage of the process, the chicken carcass has had its guts removed and the hollow carcass is placed over the cone which is partially truncated.

The conveyor moves continuously at a fairly high rate of speed, and at some initial point on the lines, the chickens are manually hung from the shackles or placed on the cones. As with any processing plant, it is important to track inputs and know where, and at what stage, productivity losses occur. Because the conveyor runs continuously, and is loaded manually and continuously, it is hard to maintain an accurate count of chickens processed. Even if an accurate count of the chickens loaded is managed, as the conveyor progresses through the plant, chickens and chicken carcasses may fall from the conveyor for various reasons. These reasons include inadequate initial hanging of the chicken, flailing about of the chicken, entanglement of adjoining chickens and shackles, unbalanced placement on the cones, and interaction of processing equipment and workers with the chickens. Therefore, in addition to an initial count of chickens placed on the conveyor, it is desirable to monitor the conveyor at various points in the plant to know where any deviations between input and output originate. The present invention provides accurate counts to satisfy this need for information. Different embodiments of the invention apply to each of the types of conveyors.

DESCRIPTION OF THE PRIOR ART

U.S. Pat. No. 5,646,398 by Sieksmeier et al. is directed to counting hangers being carried on a conveyor. The conveyor may be the type of conveyer that carries longer bars with the bars carrying the hangers, or it may be a more continuous chain type conveyer where the segments are somewhat small. Sieksmeier uses optical light beams distributed in pairs along a vertical line. The vertical pairs allow the detection of which direction the object is traveling by which optical beam of the pair is interrupted first. The use of pairs of optical sensors along a vertical line also provides means for detecting hangers which have become tangled and are crossed over, and for counting that situation as two hangers as opposed to one. For example, sensors at the top of the lines of sensors may detect only one hanger where the hangers are crossed over each other, but sensors lower in the line of sensors will see two hangers, because at that point, the profile of the tangled hangers will be wider or even separated into two hangers again, allowing the pattern of optical beam interruption to be interpreted as two hangers. A microprocessor unit or other such unit is electronically interfaced with the array of optical light beam sensors and is able to interpret the signals received to distinguish the direction of the hangers, whether or not one or two hangers are present at a particular point, and to provide a total count of hangers carried by the conveyor.

U.S. Pat. No. 5,033,065 by Keromnes et al. is directed to an invention for counting objects having poorly defined shapes, or living animals. The invention is applied to situations using a conveyor to conduct the objects, or living animals, through a process situation. The essential aspect of the invention is a number of optical light beam sensors lined up with each other to define a monitored space. On one side of the monitored space are a line of sensors emitting light, and on the other side of the space are the parts of the sensors intended to receive the light. As an object passes down the conveyor and through this line of light beams, some number of light beams will be disrupted and generate distinct deduction impulses. A comparator counts the number of deduction impulses received and compares that number to a preset value. When the preset value is exceeded, a counting impulse is emitted by the system and an increment is added to the count. An aspect of the preferred embodiment is that infrared beams are used in the array of optical light beam sensors to avoid interference from ambient light. Generally, the array of sensors define a space to be monitored, and when a sufficient number of light beams of the array is interrupted, it is deemed that an object is passing through and an increment is added.

U.S. Pat. No. 5,614,709 by Smith is directed toward counting work pieces on a conveyor as well. It is directed more toward conveyors carrying sheets of paper in the printing industry. Typically, gripper bars attached to conveyors tow the sheets with clips that are fixed to the gripper bars. Smith describes a state of prior art where optical beams are used to count the sheets on a conveyor, whereby, the bar towing the sheet and the sheet being towed are each counted when they interrupt the light beam, and then the total number of interruptions of the optical beams is divided by two. This will be inaccurate if the clip holding the sheet of paper to the bar is aligned with the place where the optical beam will be monitoring the conveyor. Such an alignment causes the tow bar, the clip holding the paper, and the paper to all register as a single interruption of the optical beam, and this reduces the total number of interruptions counted and therefore, the final count for the paper.

Another method which Smith seeks to improve is a method whereby the durations of the interruptions and durations of the uninterrupted periods are timed. These durations are compared to preset values and so, for conveyers having variable feed, this method can be inaccurate when the range of conveyer speeds is large enough to cause longer durations to appear short when a conveyer is going fast or shorter durations appear long when the conveyor is passing slowly. Smith overcomes this fault by comparing the period of time where the beam is uninterrupted to the period of time the beam is interrupted. This comparison is consistent as the speed of the conveyer changes and is performed by a microcomputer which receives the signals of a completed optical light beam sensor or an interrupted optical light beam sensor. Some care must be taken however, to make sure that the parameters set in the system are capable of monitoring the full speed range of the conveyer without still being confused between the uninterrupted time periods and the interrupted light beam time periods. This is done by manually setting the perimeters according to the particular speed capabilities of the conveyer.

U.S. Pat. No. 6,496,273 B1, by Stimpson et al., is related to machine tooling and coordinate positioning of tooling in machining, or other processes. Stimpson uses a light beam to delineate a specific position with respect to the machine and when the tool or other object breaks the light beam, the machine then knows the position of the object or tool. The position determining apparatus uses a beam emitter and a beam receiver. To keep these clean, they are mounted within housings having apertures aligned with each other. The beam passes through the apertures from the emitter to the receiver. Internal to the housing is a cavity which is kept at positive air pressure. The positive air pressure is maintained by introducing filtered compressed air into the housing and only allowing air to flow out of the apertures, thereby preventing any dust or other debris from passing into the housing through the aperture and covering, or otherwise limiting, the efficiency of the light beam.

SUMMARY OF THE INVENTION

The present invention is directed to counting the chicken carcasses and chickens, or bodies, as they pass certain points in the plant on the conveyor. It uses multiple optical sensors placed in strategic locations about the conveyor combined with special logic to obtain a high degree of accuracy in counting chickens and chicken carcasses on the continuously moving conveyor. Along with the high degree of accuracy produced by the system logic, redundancies are provided with additional sensors and within the logic to allow an accurate count, even if one or more of the sensors is lost as a source of information. The system also has several features to keep itself clean in a notoriously dirty environment. This maintains the ability to keep an accurate count over longer periods of time with reduced maintenance.

Among the features of this invention, optical sensors are placed in recessed pockets in a steel tubing frame to avoid direct settling of debris upon the sensors. Additionally, filtered air may be blown through the tubing to exit at the sensors to prevent debris from entering the pockets. The actual mounting of the sensors is accomplished in such a way that they are easily adjusted for alignment and accessed for cleaning. This is accomplished by having the cover plate that covers the pocket coupled to the sensor mounting plate within the pocket. If the mounting plate is moved to align sensors, it will shift its cover plate with it and the cover plate can then be tightened in position to seal after the adjustment is complete.

Generally, for an embodiment adapted to the conveyor with hanging shackles, there are several sensors used at any given monitoring point along the conveyor, and they are positioned in three different vertically distinct regions. Sensors are located at the trolley base level and they are blocked when a trolley base passes them. The trolley base is the most dependable location to know that a chicken may be passing the count location because of the trolley's width, its integral connection to the conveyor, and its relative stability. Below the optical sensors for trolleys are sensors that verify a shackle shaft is attached to the trolley. A trolley without a shackle would not be expected to be carrying a chicken or chicken carcass. Finally, in the vertical region where the chicken is expected is a set of optical sensors located to confirm with each other whether or not a chicken or chicken carcass is present. Logic is applied to the readings taken by the optical sensors, particularly those located at chicken level, to determine whether an increment should be added to the count. In addition to counting each chicken that passes by particular locations, a flag is placed on the conveyor at the trolley base level to mark and count when the conveyor has completed a loop.

For a conveyor in which the carcass is supported from below, sensors are located at two different levels. At each level, two optical light sensors are directed across the path of the conveyor and horizontally aligned with each other along the direction of travel of the conveyor. One set of optical sensors is located at a level where the shafts can be detected. These shafts are carried by bases that are attached to the conveyor. This is the level that indicates whether a carcass should be present. The other set of sensors is located at the level of the cones and at a location on the height of the cones experientially determined to sense carcasses on both the small and large ends of the range of variation. Large carcasses may ride very low on the cones, and small carcasses may ride high on the cones. The ratio between the width of the cone where the sensors are located and the width of the shaft are known, or can even be self-taught by an empty conveyor, and when the optical sensors at the cone level are blocked for a longer period than they should be in comparison to those at the shaft level, a carcass is determined to be present. The reduction of levels of sensors by one is possible because of the lesser degree of freedom of the cones compared to the shackles. This embodiment can rely upon detecting the shaft alone with no need to detect the base.

As discussed above, the method and device of the present invention overcomes the disadvantages inherent in prior art methods and devices. In that respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. While the terms "chicken" or "chickens", are used in this application, it should be understand that this invention and its field include poultry processing in the more general sense. Somewhat similarly, "body" or "bodies" should be considered as encompassing both live poultry and poultry carcasses. Also, while the carriers on the different types of conveyors are described as shackles and cones, the carriers themselves need not be limited to these types of carriers for the present invention to work. The invention would be capable of counting objects riding on a wide variety of carriers. For example, rather than cones, cross members on the shafts could support the poultry body, and rather than shackles, tethers could suspend the poultry. These are only a few of the possible carrier variations.

Accordingly, those skilled in the art will appreciate that the conception upon which this invention is based may readily be utilized as a basis for the design of other structures, methods, and systems for carrying out the several purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application, nor is it intended to be limiting to the scope of the invention in any way.

BRIEF DESCRIPTION OF THE DRAWINGS

Additional utility and features of the invention will become more fully apparent to those skilled in the art by reference to the following drawings, which illustrate the primary features of the several embodiments of the present invention.

DETAILED DESCRIPTION OF THE PREFERRED EMBODIMENT

The detailed description below of certain embodiments is intended to explain the current invention. It is to be understood that a variety of other arrangements are also possible without departing from the spirit and scope of the invention.

The present invention provides accurate counts of chickens or chicken carcasses traveling on a conveyor in a poultry processing plant. Count stations are located at various selected points along the conveyor's path to count the number of chickens processed and compare counts at different locations to learn where chickens are being lost in the process. Two embodiments will be described as they apply to two different types of conveyors, one in which the chicken or carcass hangs from the conveyor and one in which the carcass is supported above the conveyor. These conveyors use two different types of carriers.

Figure 1:
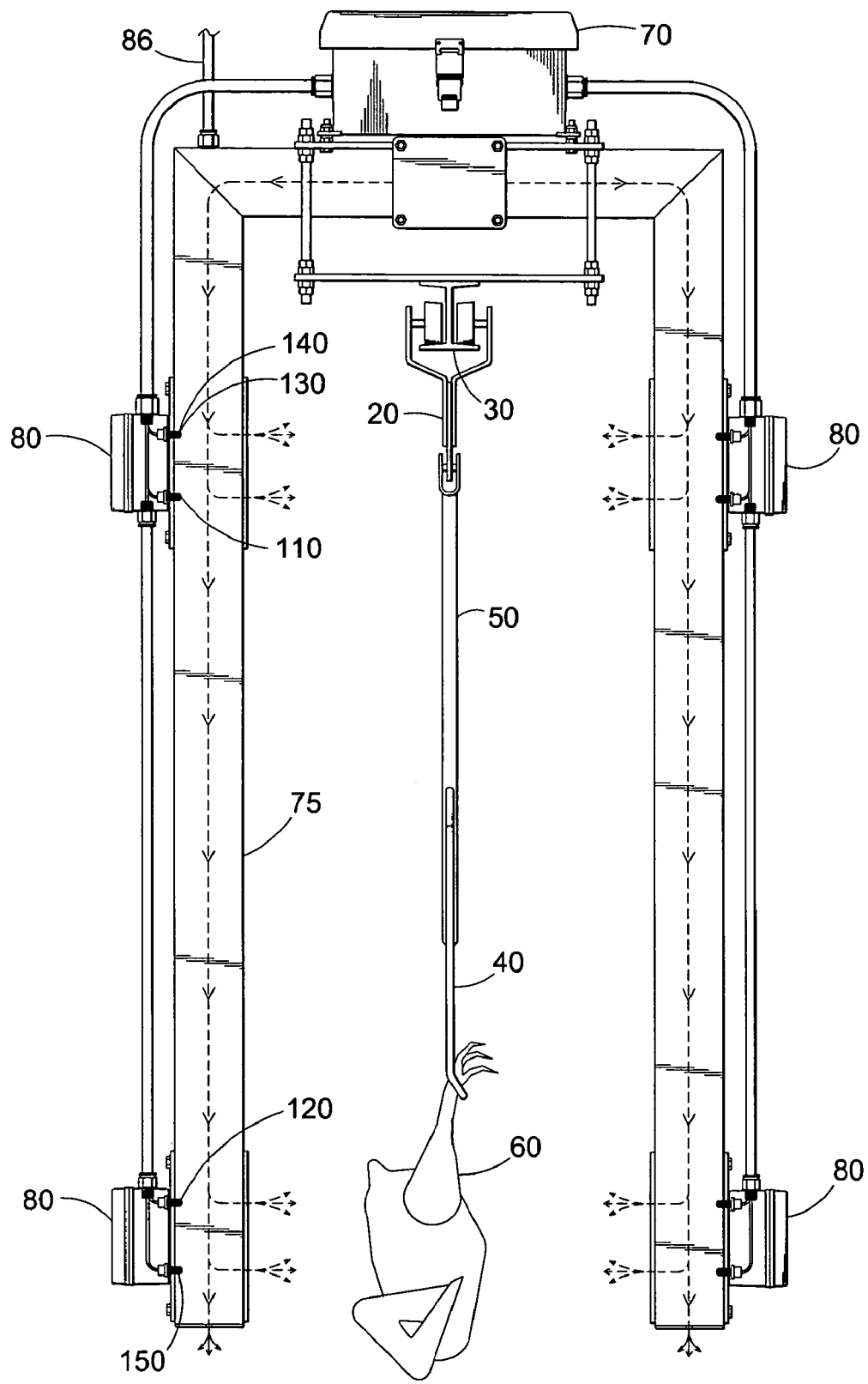
FIG. 1 shows an in-line view of a trolley and shackle carrying a chicken carcass through a counting station using one embodiment of the present invention.

FIG. 1. shows the conveyor and counter system from an end view. For the conveyor where the chicken or carcass hangs from the conveyor, the unit that actually carries the chicken comprises a trolley base 20 which runs in the track 30 of the conveyor and a shackle 40 suspended by a shaft 50 from the trolley base 20. The shackle 40 is formed to hold a chicken 60 upside down by the feet or legs. The count stations utilize several optical sensors to accurately read whether a chicken is present on a carrying unit. The sensors are located at the three levels of the base 20, shackle shaft 50, and chicken 60, and logic is applied to readings made by the sensors to interpret whether a chicken is present. The sensors are located within rectangular steel tube framing 75 and features are built into the system to facilitate ease of setup, cleaning, and maintenance as well as to enhance system robustness.

Figure 3:
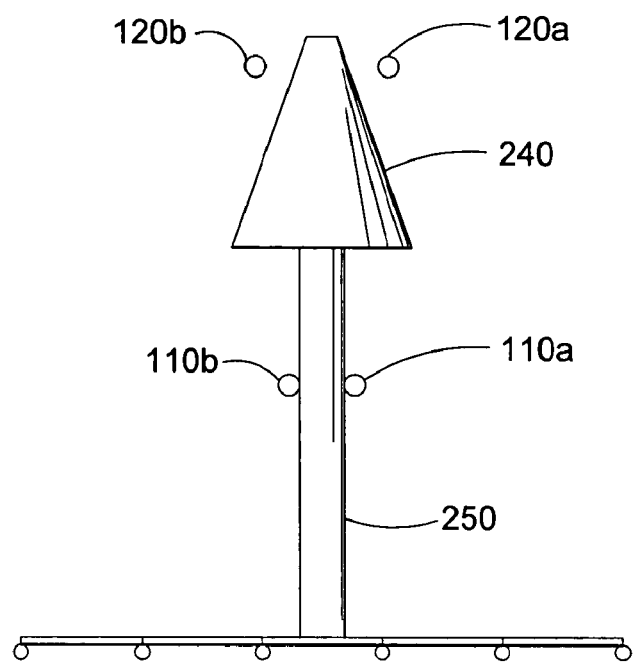
FIG. 3 shows a carrier cone without a carcass.
Figure 4:
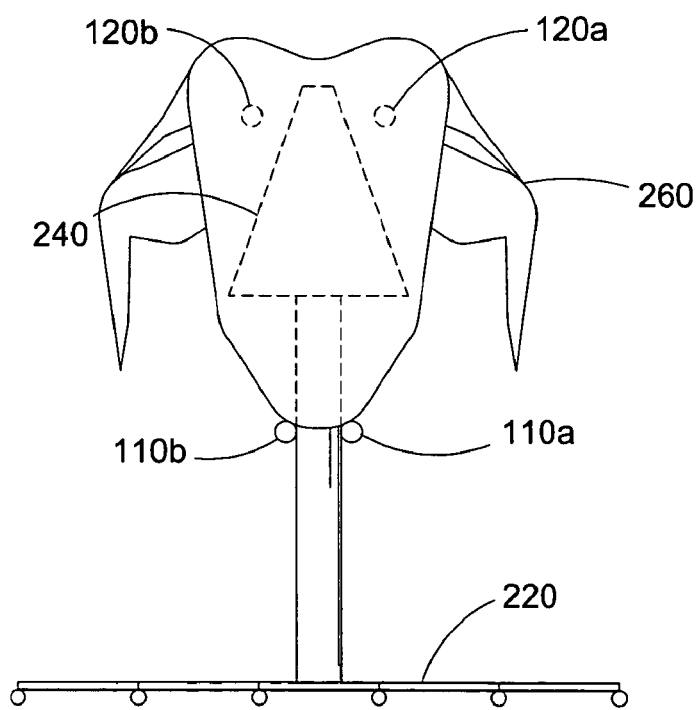
FIG. 4 shows a carrier cone with a carcass.
Figure 5:
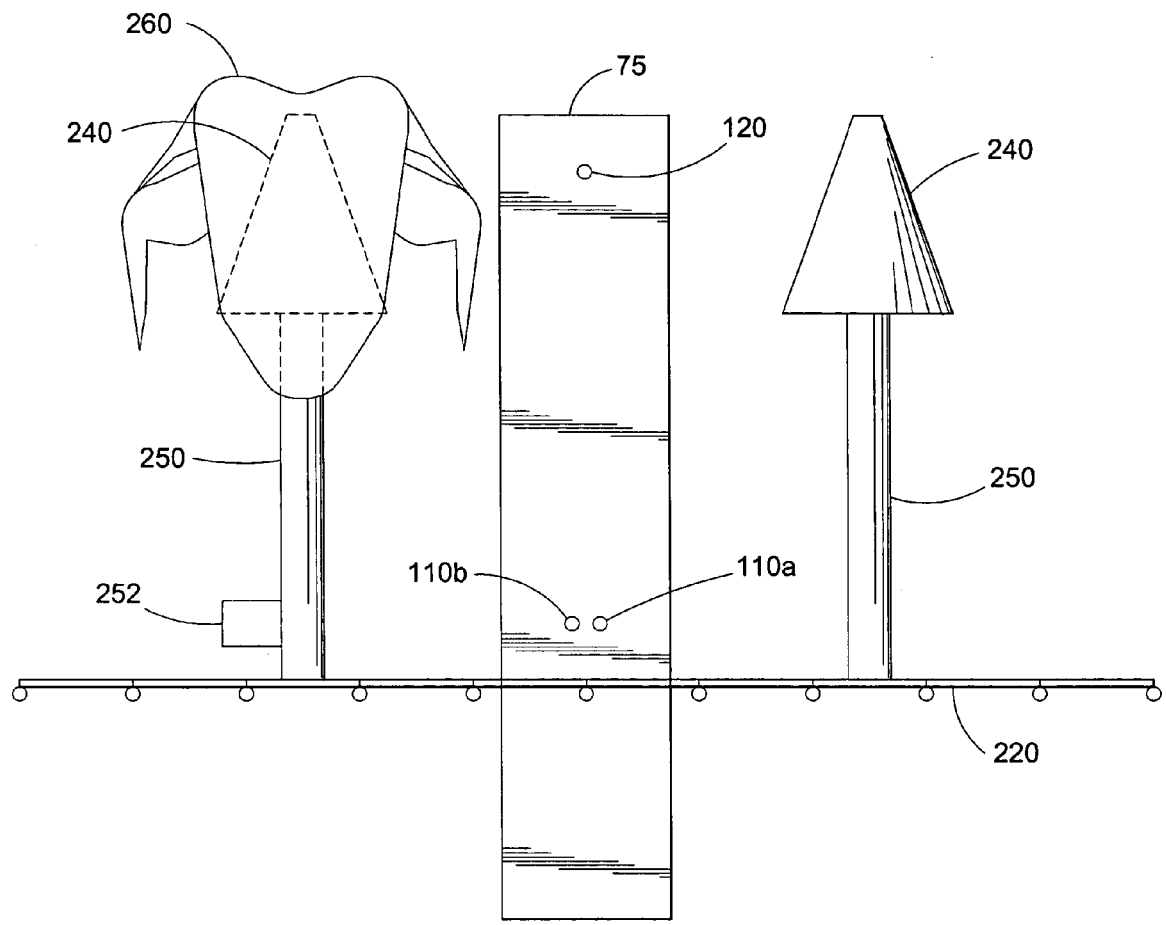
FIG. 5 shows an alternative count station for a cone conveyor.

The other type of conveyor, shown in FIGS. 3, 4, and 5, supports hollowed carcasses 260 above the conveyor on cones which are tapered pointing upwards with the tapered end partially blunted. The cones 240 are supported by shafts 250 which ride bases 220 on the conveyor. For this type of conveyor, the sensors are located at two levels, one level at shafts 250 and the other at carrier cones 240 where the carcasses 260 will also be present. Again, the sensors are located within rectangular steel tubing 75 (FIG. 5).

One embodiment of the present invention utilizes optical sensors that operate with continuous light beams. A controller associated with each sensor checks the status of the beam at an extremely high rate, even up into thousands of times per second, and generates a signal based on whether or not the light beam is blocked. These controllers are housed in control box 70 shown in FIGS. 1 & 2. The system scans the various optical sensors at a slower rate than at which the optical sensors are operating, with the system scanning at a rate of at least 512 times per second, but capable of still higher rates. The system controls are also located in control box 70.

Each sensor's central unit is a controller that generates the light beam and checks its blocked or unblocked status several times per second. The light beam is directed from the sensor controller through optical fibers to a remote sending lens where the light beam exits to travel across a space to be monitored. On the opposite side of the space to be monitored is a receiving lens aligned with the sending lens to receive the light beam. Upon entering the receiving lens, the light beam enters an optical Fiber which conducts it back to the sensor controller. When an object is between the sending lens and the receiving lens, the light beam is blocked, and the controller does not receive the return signal when it checks the status of the light beam. A counter tracks how many scans indicated a blocked light beam and if a lower threshold is surpassed, the controller for that light beam sets its state to off, or blocked, and this is the state of the input into the greater system and its logic. The system logic uses the state of various sensors as the input values for the logic to set and reset values and counters in the system. Each optical sensor has two settings from 1 to 100 associated with it. The first setting represents the number of consecutive scans with a blocked light beam required to change the state of an associated logic switch from open to closed. The second setting represents the number of consecutive scans with unblocked light beam required to change the state of the associated switch back from closed to open. When discussing the logic of the switches, or inputs, it is important to keep in mind that the blocking of a light beam for a single scan is not necessarily adequate to change the status of the input in the logic structure. Rather, as noted above, the number of consecutive scans with light beam blocked, or unblocked, that is required to change the status of an input may be changed by adjusting settings for that purpose. However, even if a light beam is required to be blocked for several scans, that would still be a fraction of a second. Also, it should be appreciated that the current invention could be accomplished with other variations in the particular sensing hardware. Adjustments in the particulars of the logic in the system would adapt to different specific hardware configurations and remain consistent with the scope of the present invention. For example, the optical sensor could use a reflector to bounce back a light beam or be a diffuse optical sensor.

The above discussion of fiber optics, scan rates, etc. should not be construed as indicated that those types of optical sensors are required for the present invention. Other optical sensors using localized beam generators, reflectors or diffuse optical sensors could also be used. The above explanation is intended to assist in understanding the concept and use of threshold settings discussed below.

Before discussing embodiments of the present invention further, it is useful to define some terms for shorthand use. Some of the optical sensors will be spaced from each other a distance based upon a dimension of the object that the sensors will be monitoring. For example, if the two sensors are monitoring trolley bases 20, they may be set at a distance nearly equal to the width of trolley base 20. However, they may be spaced at a width nearly equal to the width of trolley base 20, but just a little wider, so that the two sensors cannot simultaneously register a standard base 20 at any time. This distance will be referred to as "width plus". On the other hand, the sensors may be monitoring a type of object and spaced a distance nearly equal to the width of that object, but a little less, so that as the object passes, both sensors can briefly register the object at the same. This distance will be referred to as "width minus".

Figure 2:
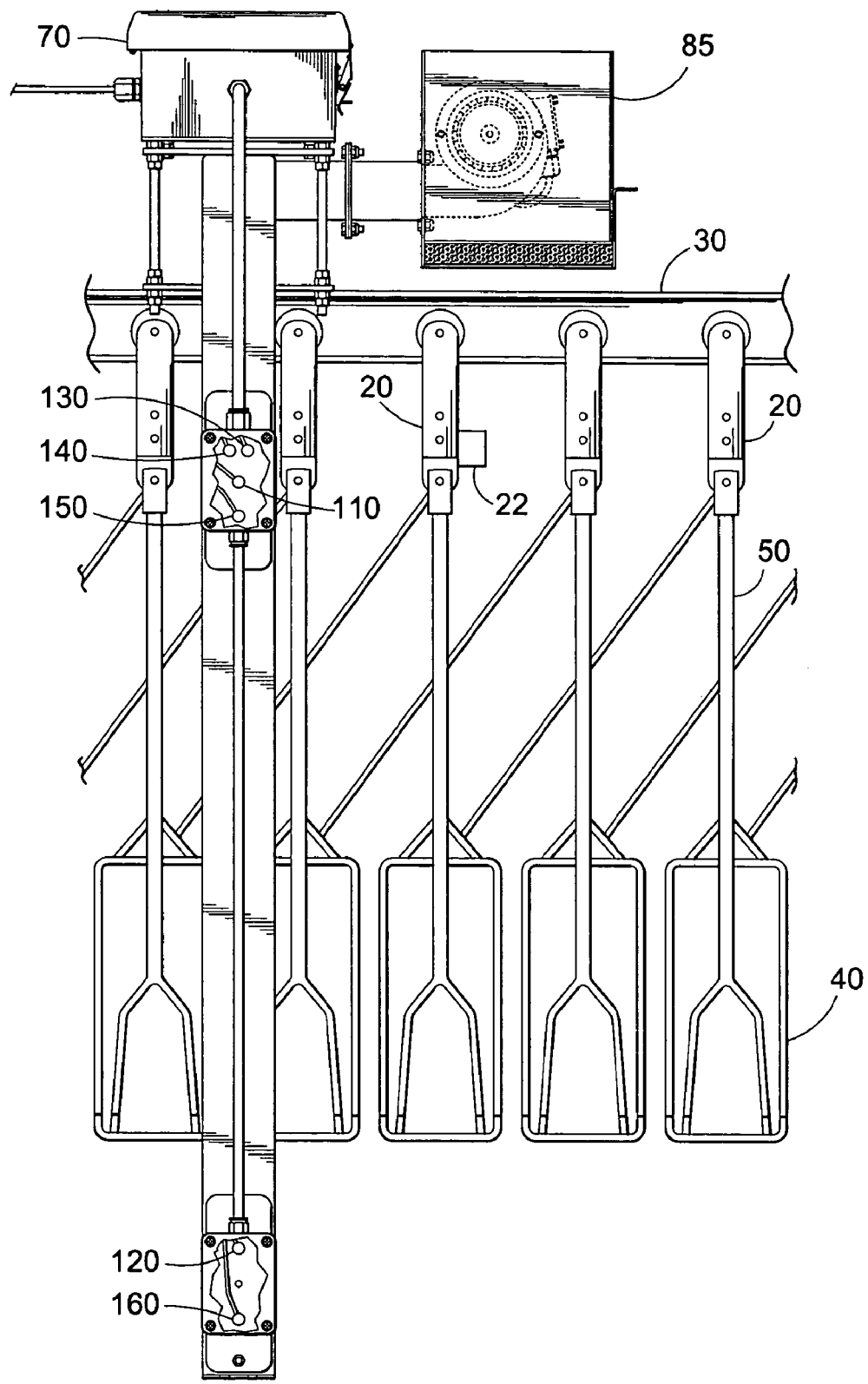
FIG. 2 shows a side view of several trolleys and shackles passing through a counting station using one embodiment of the current invention.

Now the embodiment where the chickens and chicken carcasses hang from the conveyor will be discussed in more detail. Reference will be made to FIGS. 1 and 2. As the initial step to accurately sense whether a chicken or chicken carcass 60 is present is knowing whether one should be present, the system logic begins with checking for a base and carrier shaft being present at the counting point. This embodiment checks at trolley base 20 and shackle shaft 50. Two optical light beam sensors are used to sense and count trolleys 20. They are aligned horizontally and spaced at trolley base width minus so that they can briefly both be obstructed at the same time by a single trolley 20. FIG. 2 shows a side view of trolleys passing through the frame of a counting station, going from right to left. As a trolley enters the counting station, the leading edge of the trolley will obstruct Sensor 1 at 130 of the system and cause Input 1, the input associated with Sensor 1 at 130, to be switched from opened to closed. As the trolley progresses through the frame, the leading edge of the trolley will obstruct Sensor 2 at 140 and cause Input 2, the input associated with Sensor 2 at 140, to go from opened to closed.

When both the inputs, Inputs 1 and Inputs 2, have a closed status, the system will actively check for the presence of a shackle 40 and shaft 50 in association with the sensed trolley. It does this by monitoring Inputs 3 and 4, associated with Sensors 3 at 110 and Sensor 4 at 150 respectively. Sensors 3 at 110 and 4 at 150 are aligned vertically in relatively close proximity to each other and to where the shackle attaches to the trolley. Inputs 3 and 4 are monitored for the duration of the time when Inputs 1 and 2 are closed. During that time, if both Input 3 and Input 4 are switched to closed for some part of that time frame, then a shackle is considered present. Although highly likely, considering where Sensors 3 at 110 and 4 at 150 are located, it is not necessary that Inputs 3 and 4 have a closed status at the same time, but only that at some point in time while the trolley's Inputs, 1 and 2, are both closed, each of Inputs 3 and 4 obtain a closed status. When the trolley progresses further, its trailing edge unblocks Sensor 1 at 130 and Input 1 changes to opened status again. At that point, if either Input 3 or Input 4 has never changed status to closed during the time that the trolley has Inputs 1 and 2 at closed status, then the system determines that a shackle shaft 50, and therefore a shackle 40, are not present on the trolley. Sensors 3 at 110 and 4 at 150 are somewhat redundant and enhance robustness in a difficult environment. Should either sensor become inoperative, the counting system can still operate with minor adjustments in programming.

Along with checking for a shackle 40 when both Inputs 1 and Inputs 2 switch to a closed state, the system also begins checking for the presence of a chicken or chicken carcass 60 on the shackle 40 at that point in time. The sensors that are dedicated to monitoring for that purpose are Sensors 5 at 120 and 6 at 160 which are aligned vertically with each other. Because of the range of possible sizes of chickens 60, Sensors 5 at 120 and 6 at 160 are located further from each other than Sensors 3 at 110 and 4 at 150, and Sensors 5 at 120 and 6 at 160 are located at different distances from the end of the shackle 40 depending on where in the process the counting station is located. If the station is located early in the process, Sensors 5 at 120 and 6 at 160 will monitor a space further from the end of the shackle because the chicken will be hanging by its feet, whereas, if the station is located late in the process, Sensors 5 at 120 and 6 at 160 will monitor a space somewhat closer to the shackle 40 because the chicken carcass 60 will be hanging by the knuckle at the end of the thighs. The vertical distance between Sensors 5 at 120 and 6 at 160 is defined by the expected range of chicken sizes. Sensors 5 at 120 and 6 at 160 are somewhat redundant and enhance robustness in a difficult environment. Should either sensor become inoperative, the counting system can still operate with minor adjustments in programming. Also, while the sensors at the various horizontal levels are generally aligned vertically, this alignment need not be precise.

Because of the irregular shape involved and the possible high degree of activity and motion from the hanging chickens, a percentage system is used to count the chickens themselves as opposed to simple registering of an open or closed input. As with many control systems, the processor and controls in the present invention scan the status of sensors and inputs continuously and at very high rates on the order of hundreds of times a second. When Input 1 is currently closed and Input 2 switches to closed, indicating the presence of a trolley base 20, the system starts from zero and begins to count the number of times the inputs are scanned. The system also begins to count the number of scans that see Input 5 closed and the number of scans that see Input 6 closed. When Input 1 returns to open status, the system stops counting and stores the current values for the number of scans and for the number of scans for which Input 5 was closed and for the number of scans for which Input 6 was closed. In the present invention the number of scans is denoted as the current detect time, and the other quantities are denoted as the current input #5 detect level and the current input #6 detect level, respectively. This is only a matter of nomenclature and is specified only to assist discussion of the present invention.

To evaluate the values recorded when a trolley base passes, the current input #5 detect level and the current input #6 detect level are each divided by the current detect time and multiplied by 100. The resulting percentage values are compared to input #5 detect setting and input #6 detect setting respectively. All four of these values represent the percentage of time that a sensor is blocked and producing a closed input. The detect settings are manually preset threshold values indicating that a chicken is present on the shackle. If both the percentages associated with the current input #5 detect level and the current input #6 detect level exceed their respective detect setting, then the count for chickens is incremented by one. This count is denoted as the primary bird count.

The manually preset values for the detect levels is varied depending on where in the process the counting station is located. If the count is to be conducted before the chicken is de-feathered, the chicken will have a larger effective profile and the optical light beams should be reliably blocked for a larger period of time. If the counting station is late in the process, after the feathers have been removed, the detect levels are set lower in anticipation of the chicken having a smaller effective profile.

In addition to a total count of trolleys, shafts and shackles, and chickens, the apparatus and method of the present invention is capable of measuring the current rate for those same quantities. At the beginning of each successive minute the accumulated count for trolleys, shackles, and chickens are saved as the "current #1 trolley variable", the "current #1 shackle variable", and the "current #1 bird variable" respectively. The values for the "previous #1 trolley variable", the "previous #1 shackle variable", and the "previous #1 bird variable" are subtracted from their corresponding current variables to obtain the current rates. The current rates are recorded as such and the values for the "current" variables are transferred into the "previous" variables for the ensuing calculation for the next minute.

Now the conveyor carrying the carcasses on cones will be discussed in more detail. Reference now will be to FIGS. 3, 4 and 5, where FIG. 3 shows a bare cone and FIG. 4 shows a cone carrier 240 carrying a carcass 260. FIG. 5 shows an additional embodiment with an aspect of redundancy removed. The four sensors in FIG. 3 and FIG. 4 are numbered the same in each illustration and the carriers, cones 240 and shafts 250, should be considered as moving from left to right through the sensors. The cones 240 are shown having already blocked the left-most sensors Sensor 9 at 110*b* & Sensor 7 at 120*b* in the sets and approaching the second sensors Sensor 10 at 110*a* & Sensor 8 at 120*a* in the sets on the right. Sensor 9 at 110*b* and Sensor 10 at 110*a* are spaced at shaft width minus distance apart, while Sensor 7 at 120*b* and Sensor 8 at 120*a* are spaced cone width plus distance apart.

Sensors 9 at 110*b* and 10 at 110*a* monitor the carrier unit at the shaft 250 level and provide unambiguous information on the location of a carrier. These sensors also allow the calculation of the speed of the conveyor independent of communication with the conveyor controls. Knowing the speed of the conveyor allows the controller for the count station to calculate how long an empty cone should block the sensors located at cone level. If the Sensors 7 at 120*b* and 8 at 120*a* are blocked for a longer period of time than the system estimates they should be blocked, a carcass 260 is then determined to be present.

While the cone carriers are more stable than the shackle type carriers, as with most mechanical systems, the cone carriers may vibrate. These vibrations can be further amplified in the body 260 of a chicken. As with the conveyor where the chickens hang from shackles, the controllers for the individual Sensors 7, 8, 9, and 10 have threshold settings. The sensors' blocked or unblocked status are scanned at high frequency rates by their controllers, and when the number of consecutive scans show a blocked sensor or unblocked sensor, the status of that sensor's input to the system is changed. If the threshold number for a blocked sensor is exceeded, then the system input associated with that sensor is changed from open to closed. If the threshold number for an unblocked sensor is exceeded, the system input associated with that sensor is changed from closed to open. The ratio of the duration of time for which a bare cone has closed inputs into the system to the duration of time for which a shaft has closed inputs into the system is known. If the inputs for the cone sensors, Sensors 7 at 120*b* and 8 at 120*a*, are closed for a longer time than is indicated by that known ratio, a carcass 260 is determined to be on the carrier cone 240 and a number is added to the count.

The system can train itself by running empty for at least one loop of the conveyor. This gives the system the opportunity to define the empty cone to shaft ratios, determine the ratio between the shaft diameters and the distance between the shafts, and count the number of carriers in a loop of the conveyor. Establishing these parameters allows the system to adapt to different speed settings for the conveyor. In addition to counting each carrier unit that passes a station, a station may count the number of times a conveyor completes a loop. This is accomplished by placing a flag 252 on the shaft 250 of a single carrier, as shown in FIG. 5. The prolonged blockage of the sensors by this flag indicates to the system that the conveyor is starting another loop.

Returning now to FIG. 4, where Sensor 9 at 110*b* and Sensor 10 at 110*a* are set narrowly enough to register shaft 250 at the same time, an alternative embodiment would align Sensor 7 at 120*b* and Sensor 8 at 120*a* vertically with their respective sensors below at 110*b* and 110*a*. This would mean that Sensor 7 at 120*b* and Sensor 8 at 120*a* would both register an empty carrier cone 240 at the same time for some brief period of time, and the same is true for Sensor 7 at 120*b* and Sensor 8 at 120*a* with regard to a poultry body 260. However, the time periods for which Sensor 7 at 120*b* and Sensor 8 at 120*a* register an object could still be compared to the time period for which Sensor 9 at 110*b* and Sensor 10 at 110*a* register shaft 250 to determine whether a carrier cone 240 or a poultry body 260 has been detected. The controls of the counting system would be programmed to make these comparisons and could accommodate many different locations and combinations of optical sensors to check for a carrier and confirm the presence of chicken or chicken carcass. As the carrier varies, different optical sensor locations may be more effective.

FIG. 5 shows another embodiment used to count poultry bodies 260 on a conveyor with carrier cones 240. This system has a redundancy removed as compared to the system shown in FIG. 3 and FIG. 4. As can be seen in FIG. 5, the optical sensors 110*b* & 110*a* located at the level of shaft 250 are placed narrowly enough that both will register shaft 250 at the same time for a brief period of time as the conveyor progresses, but only a single optical sensor at 120 monitors for poultry bodies 260. When a poultry body 260 is present, the amount of time that the optical sensor at 120 will register an object is longer than when only an empty carrier cone 240 is present. To normalize for the speed of the conveyor, the controls compare the amount of time that the optical sensor at 120 registers something to the amount of time that the optical sensors at 110*b* and 110*a* register shaft 250. The system knows the ratio of time an empty carrier is visible to the optical sensor at 120 to the time sensors at 110*b* and 110*a* register a shaft. The speed of the conveyor is only a multiplier and does not effect this ratio. This ability to normalize for the speed of the conveyor does require the system to know the ratio. This can be accomplished by running the conveyor empty for a sufficient amount of time for the system to establish the ratio. To some extent, the single optical sensor 120 is the extreme case of the embodiment discussed immediately above where Sensor 7 at 120*b* and Sensor 8 at 120*a* are moved in more narrowly to align with the sensors for shaft 250.

Moved even more closely together, Sensor 7 at 120*b* and Sensor 8 at 120*a* would not provide different time information, and a single optical sensor at 120 functions the same. The optical sensors at 110*b* and 110*a* also assist in tracking the number of times a conveyor has circulated by noting the passing of flag 252 and also in analyzing which direction the conveyor is traveling by their order of registering shaft 250.

The location of the sensors having been discussed with respect to two types of conveyors, the method of mounting the sensors will now be discussed. FIG. 1 shows a single carrier with a chicken carcass passing through a counting location mounted on a frame of rectangular steel tubing 75. On the outside of the frame 75 are mounted junction boxes 80 containing the sensors. These junction boxes 80 are held to the frame 75 by mounting plates which themselves are attached to the frame.

Figure 6:
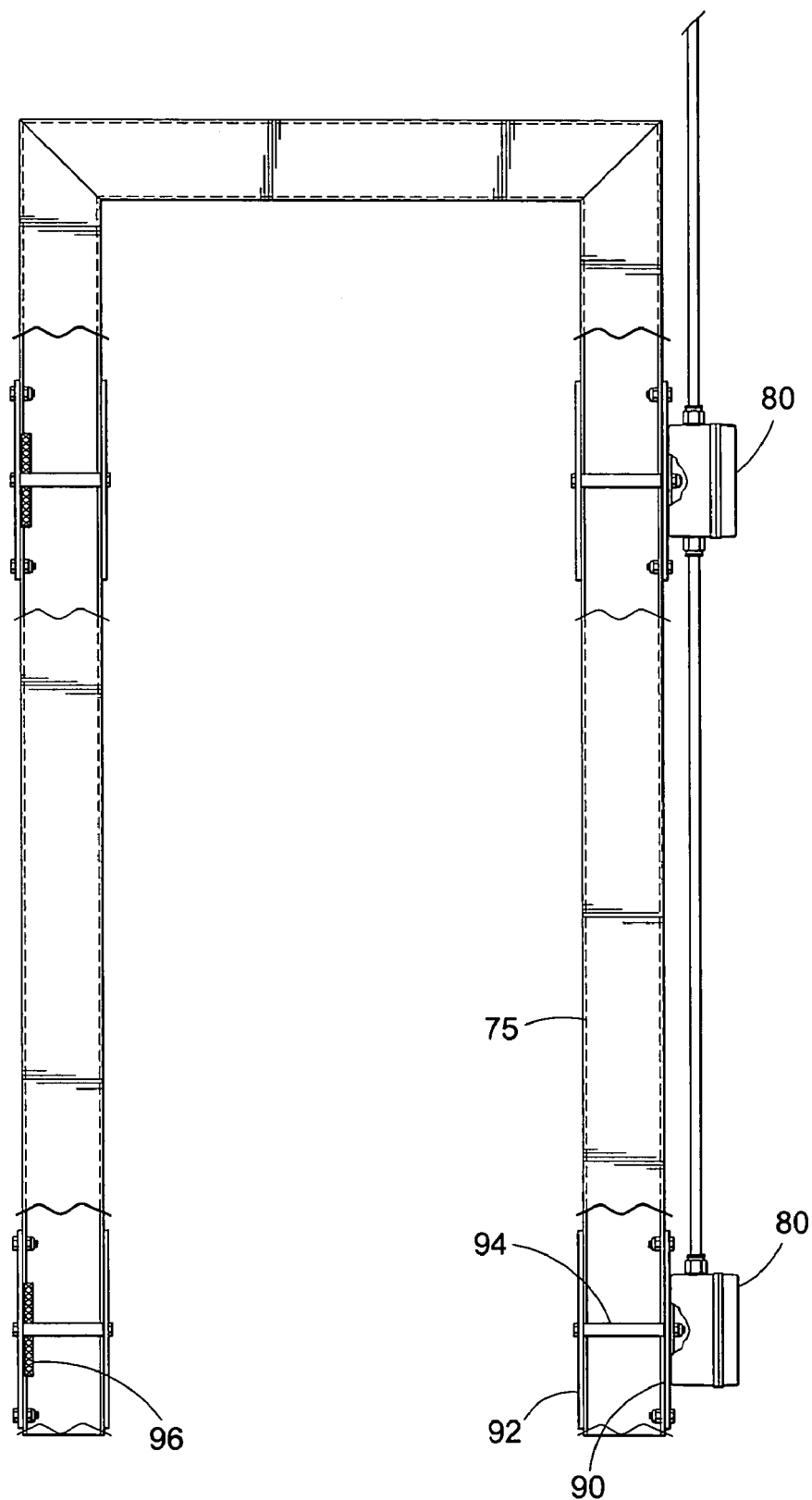
FIG. 6 shows an in-line view of a counting station frame and the sensor mountings.

FIG. 6 shows an alternative embodiment using a different type of sensor while at the same time showing the mounting plate 90, cover plate 92, and cover plate post 94 fixed to the mounting plate 90. The alternative embodiment shown utilizes a sending and receiving unit mounted on one side of the frame and a reflector 96 mounted on the other side. The optical sensor light beam is directed to the reflector across the space to be monitored and, if the line of sight is unobstructed, the beam is reflected back to a receiving unit mounted in proximity to the sending unit. If the receiving unit receives a signal there is no object in the line of sight. If no signal is received, an object is in the line of sight.

Figure 7:
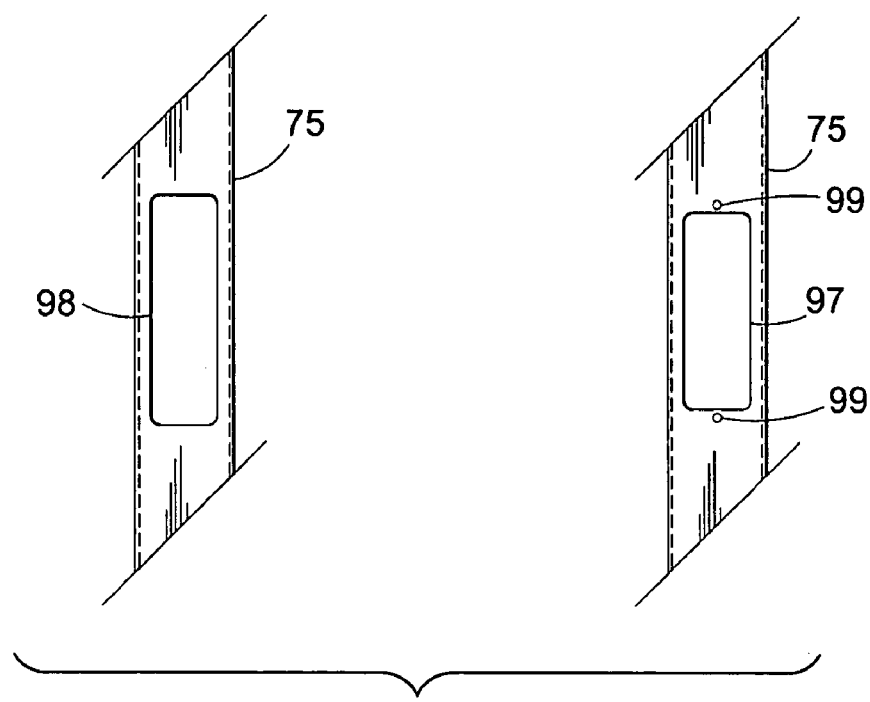
FIG. 7 shows the pocket cut-outs in the counting station frame.
Figure 8:
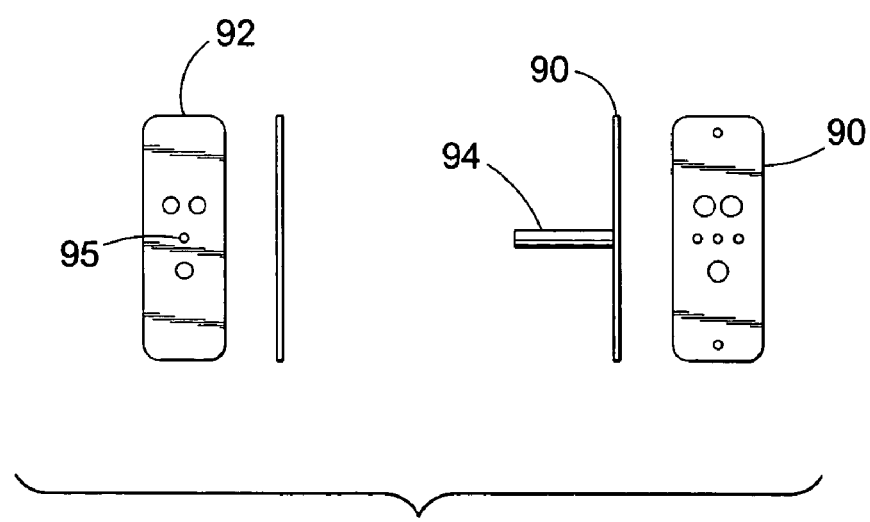
FIG. 8 shows the mounting plate and cover plate for sensors.

FIG. 7 shows the cutouts in the frame where the sensors are mounted and through which the optical light beams pass. The wall of the tubing opposite the conveyor is the outer wall and has mounting plate cutout 97 and screw holes 99 above and below mounting plate cutout 97 to accept screws passing through frame 75. This is how mounting plate 90 is held onto frame 75. There are also screw holes in the mounting plate 90 which match those in the junction boxes 80 that hold the sensor elements, and that is how the junction boxes 80 are held to mounting plates 90. In FIG. 6, cover plate post 94 fixed to mounting plate 90 extends through the interior of tube frame 75 to the inside wall of frame 75 where the end of cover plate post 94 is flush with the surface of the frame 75. A tapped hole in the end of the cover plate post 94 receives a screw which passes through cover plate 92 and clamps cover plate 92 to cover plate post 94 and tube 75. Cover plate 92 has apertures through which the optical light beams may pass, whether the sending unit and receiving unit are located on opposite sides of the frame, or whether a reflector is used. By attaching cover plate 92 to mounting plate 90 that holds the sensors, the sensors may be repositioned for alignment with their counterpart on the other side of the frame by moving mounting plate 90. Cover plate 92 will move with the adjustment so that the line of sight through cover plate 92 will be maintained. Cover plate 92 limits exposure of the inside of the frame 75, while allowing easy access for periodic cleaning of the sensors without their removal, which would require realignment. While the illustrated embodiments uses a post that receives a screw, alternatively, the post could be a threaded stud protruding through the cover plate, and a nut could clamp the cover plate against frame.

FIG. 1 and FIG. 2 show two different embodiments of a self cleaning feature of the invention. Essentially, the rectangular steel frame is subjected to positive air pressure internally. In FIG. 1, an embodiment is shown which uses blower 85 having an air filter over its intake. Blower 85 is ducted to steel tubing frame 75 and produces a positive pressure within frame 75, so that air can only flow out at the sight holes in the cover plates. The filter on the blower intake insures that only clean air is introduced to the inside of frame 75. FIG. 1 shows an alternative embodiment using compressed air common to industrial plants. Compressed air lines 86 is connected to a coupling on the tubing frame 75. The compressed air creates the positive pressure within tubing 75 and the filters typical of compressed air systems insure this air is clean. In addition to the ability to maintain positive air pressure in the frame during operation, the system provides a means of periodically cleaning the interior of the frame as well. Pipe fittings on the frame allow water to be introduced into the interior of the frame to flush it out.

Having provided detailed descriptions of several embodiments, it can readily be seen by one skilled in the art how a counting system that verifies a carrier is present and then confirms that a poultry body is also present greatly increases the count accuracy in a difficult environment. It should be noted that there are several means to vary the specific sizing and spacing but still accomplish the construction of the invention, and individual components may be changed, too. Also, while the carriers on the different types of conveyors are described as shackles and cones, the carriers themselves need not be limited to these types of carriers for the present invention to work. The invention would be capable of counting objects riding on a wide variety of carriers. For example, rather than cones, cross members on the shafts could support the poultry body, and rather than shackles, tethers could suspend the poultry. These are only a few of the possible carrier variations. It should be obvious from this that there are numerous embodiments subsumed in the present invention and the scope of this invention should not be limited by the discussion of the embodiments above.

I claim:

1. A monitoring system for a conveyor based transport system that features a series of spaced vertical shafts, each said shaft supporting a least one carrier, said monitoring system comprising:
   a first optical sensor at a first level where said shafts travel;
   a second optical sensor at a second level where both empty carriers and objects transported by said carriers may be registered by said second optical sensor, said second level being vertically offset from said first level, and,
   controls for said optical sensors, said controls monitoring said first optical sensor to determine when a shaft is present and monitoring said second optical sensor to detect objects transported by a carrier on a detected shaft; wherein,
   said controls distinguish between an empty carrier and a loaded carrier by comparing the ratio of actual time registered by said second optical sensor to actual time registered for a respective shaft at said first level, to a pre-measured ratio of time registered for an empty carrier to time registered for a respective shaft.

2. The monitoring system of claim 1, further comprising:
   a third optical sensor, said third optical sensor located at said first level and spaced horizontally from said first optical sensor along the direction of travel of said conveyor and at a distance approximately the width of a said vertical shaft; and,
   controls monitoring said optical sensors at said first level to determine the direction of travel of a said shaft by the order in which said first and third sensors signal the presence of a shaft.

3. The monitoring system of claim 2, further comprising:
   a fourth optical sensor, said fourth optical sensor located at said second level and spaced horizontally from said second optical sensor along the direction of travel of said conveyor, and;

controls monitoring said optical sensors at said first and second level, said controls distinguishing between an empty carrier and a loaded carrier by comparing the ratio of actual time registered by said sensors on said second level to actual time registered for a respective shaft at said first level, to a pre-measured ratio of time registered for an empty carrier to time registered for a respective shaft.

4. The monitoring system of claim 1, further comprising:
a flag at said first level on one of said shafts, said flag causing said flagged shaft to take longer to pass said first optical sensor.

5. A monitoring system for a conveyor based transport system that features a series of trolleys rolling on a conveyor track, a shaft pivotally hanging by a first end of said shaft from each said trolley, and at least one carrier located at a second end on each said shaft, said monitoring system comprising:
a first optical sensor at a first level where said shafts travel;
a second optical sensor at a second level where an object being carried by a carrier on a shaft travels;
a third optical sensor at a third level where said trolleys travel; and,
controls monitoring said first, second, and third optical sensors to determine whether a trolley is present, whether a shaft is present, and whether an object is present.

6. The monitoring system of claim 5, further comprising:
a flag at said third level on one of said trolleys, said flag causing said flagged trolley to take longer to pass said third optical sensor.

7. The monitoring system of claim 5, further comprising:
a fourth optical sensor, said fourth optical sensor located at said third level and spaced horizontally from said third optical sensor along the direction of travel of said conveyor, and;
controls monitoring said optical sensors at said third level to determine the direction of travel of said trolleys.

8. The monitoring system of claim 5, wherein:
said controls use a percentage threshold to determine whether an object is being carried by a carrier, said percentage being calculated by measuring the duration of time that an object is indicated as present at said second level by the duration of time that said trolley is indicated as present at said third level.

9. The monitoring system of claim 8, wherein:
said threshold may be programmed to different settings for different locations along said conveyor.

10. The monitoring system of claim 5, wherein;
when a trolley is indicated at said third level, but no shaft is indicated at said first level, said controls record a missing shaft.

* * * * *